United States Patent
Kabbara et al.

(10) Patent No.: US 11,138,618 B1
(45) Date of Patent: Oct. 5, 2021

(54) OPTIMIZING IN-APPLICATION PURCHASE ITEMS TO ACHIEVE A DEVELOPER-SPECIFIED METRIC

(71) Applicant: Amazon Technologies, Inc., Seattle, WA (US)

(72) Inventors: Amir Kabbara, Seattle, WA (US); Corey Calvin Badcock, Seattle, WA (US); Robert Anthony Pulciani, Jr., Westfield, NJ (US); Steven Todd Rabuchin, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1217 days.

(21) Appl. No.: 14/746,683

(22) Filed: Jun. 22, 2015

(51) Int. Cl.
| | |
|---|---|
| *G06Q 30/02* | (2012.01) |
| *G06Q 30/06* | (2012.01) |
| *G06Q 10/06* | (2012.01) |
| *A63F 13/537* | (2014.01) |
| *A63F 13/792* | (2014.01) |
| *A63F 13/55* | (2014.01) |

(52) U.S. Cl.
CPC ..... *G06Q 30/0204* (2013.01); *G06Q 30/0201* (2013.01); *G06Q 30/0206* (2013.01); *G06Q 30/0282* (2013.01); *G06Q 30/0633* (2013.01); *A63F 13/537* (2014.09); *A63F 13/55* (2014.09); *A63F 13/792* (2014.09); *G06Q 10/06393* (2013.01)

(58) Field of Classification Search
None
See application file for complete search history.

(56) References Cited

U.S. PATENT DOCUMENTS

| | | | | |
|---|---|---|---|---|
| 9,799,059 B1* | 10/2017 | Curtis | ............... | G06Q 30/0283 |
| 2011/0092273 A1* | 4/2011 | Cerbini | ............... | G06Q 30/02 463/25 |
| 2012/0101886 A1* | 4/2012 | Subramanian | ..... | G06Q 30/0611 705/14.23 |
| 2012/0158455 A1* | 6/2012 | Pathak | ............... | G06Q 30/0201 705/7.29 |

(Continued)

OTHER PUBLICATIONS

Ding, "Why do I Invite Friends to Join: an Empirical Study of Mobile Social Network Game," Jun. 2014, PACIS, p. 137.*

(Continued)

*Primary Examiner* — Ivan R Goldberg
(74) *Attorney, Agent, or Firm* — Lee & Hayes, P.C.

(57) ABSTRACT

Technologies are disclosed herein for optimizing in-application purchase (IAP) items to achieve a developer-specified success metric. Application developers can define customer segments and a success metric for each segment. In-application purchase items (IAP) for an application can be tuned for each customer segment in an attempt to achieve the defined success metric. The disclosed techniques can automatically determine the most compelling combination of attributes for an IAP item, such as item price, behavior, definition, and timing. Based on contextual information received from a number of resources, such as an application store, an e-commerce system, and a user device, an optimization service can modify attributes of the IAP items for users in the customer segment to achieve the developer-specified success metrics.

20 Claims, 6 Drawing Sheets

(56) References Cited

U.S. PATENT DOCUMENTS

| | | | | |
|---|---|---|---|---|
| 2012/0166308 | A1* | 6/2012 | Ahmed | G06Q 20/12 |
| | | | | 705/26.41 |
| 2012/0231891 | A1* | 9/2012 | Watkins, Jr. | G06Q 30/0283 |
| | | | | 463/43 |
| 2013/0005438 | A1* | 1/2013 | Ocko | H04W 4/21 |
| | | | | 463/25 |
| 2013/0095910 | A1* | 4/2013 | Chu | G06Q 30/0601 |
| | | | | 463/25 |
| 2013/0179308 | A1* | 7/2013 | Agustin | G06Q 30/0641 |
| | | | | 705/27.1 |
| 2014/0106878 | A1* | 4/2014 | Knutsson | A63F 13/428 |
| | | | | 463/31 |
| 2014/0164142 | A1* | 6/2014 | Yang | G06Q 30/0273 |
| | | | | 705/14.69 |
| 2014/0207623 | A1* | 7/2014 | Novick | G06Q 30/0283 |
| | | | | 705/26.81 |
| 2014/0279216 | A1* | 9/2014 | Desmarais | G06Q 30/0633 |
| | | | | 705/26.8 |
| 2015/0174488 | A1* | 6/2015 | Dancau | A63F 13/57 |
| | | | | 463/9 |
| 2015/0209667 | A1* | 7/2015 | Burgin | A63F 13/35 |
| | | | | 463/43 |
| 2015/0356780 | A1* | 12/2015 | Madegowda | G09B 5/14 |
| | | | | 345/633 |

OTHER PUBLICATIONS

Tao, "Item Recommendation Using Collaborative Filtering in Mobile Social Games: A Case Study," 2014, IEEE Fourth International Conference on Big Data and Cloud Computing, pp. 293-297.*

Soroush, "Self-Control In Casual Games: The relationship between Candy Crush Saga players' in-app purchases and self-control," 2014, In Games Media Entertainment (GEM), IEEE, pp. 1-6.*

Lim, "Investigating Country Differences in Mobile App User Behavior and Challenges for Software Engineering," Jan. 2015, IEEE Transactions on Software Engineering, vol. 41, pp. 40-64.*

Wohn, "Spending Real Money: Purchasing Patterns of Virtual Goods in an Online Social Game," 2014, In Proceedings of the SIGCHI Conference on Human Factors in Computing Systems, pp. 3359-3368.*

Lim, "Investigating Country Differences in Mobile App User Behavior and Challenges for Software Engineering," Jan. 2015, IEEE Transactions on Software Engineering, vol. 41, No. 1, pp. 40-64 (Year: 2015).*

* cited by examiner

OPTIMIZING IN-APPLICATION PURCHASE ITEMS TO ACHIEVE A DEVELOPER-SPECIFIED METRIC

BACKGROUND

Application stores (which are commonly referred to as "app stores") typically provide functionality for allowing customers to browse and obtain applications. For example, an application store might enable a customer utilizing a smartphone or tablet computing device to browse and obtain various types of applications that are suitable for use on the customer's particular type of computing device. Some app stores may also offer additional features or aspects of these applications as in-application purchase ("IAP") items. For example, if an application includes a multiple-stage game, an app store may offer IAP items within individual stages of the game to assist a user's advancement.

Although existing app store systems allow developers to design and publish applications, some existing systems may limit a developer's ability to design and publish improvements or optimizations for applications. For instance, if a developer wishes to optimize the performance of one aspect of an application or IAP item, the developer is required to collect and interpret usage data, design one or more modifications, and submit a new version of the application or IAP item to the app store. Such a process can be cumbersome and time-consuming for an application developer, particularly when the developer is required to iterate through many versions of an application or IAP item in order to perform the optimization. Such inefficiencies do not benefit publishers, developers, or users.

The disclosure made herein is presented with respect to these and other considerations.

DETAILED DESCRIPTION

Figure 1:
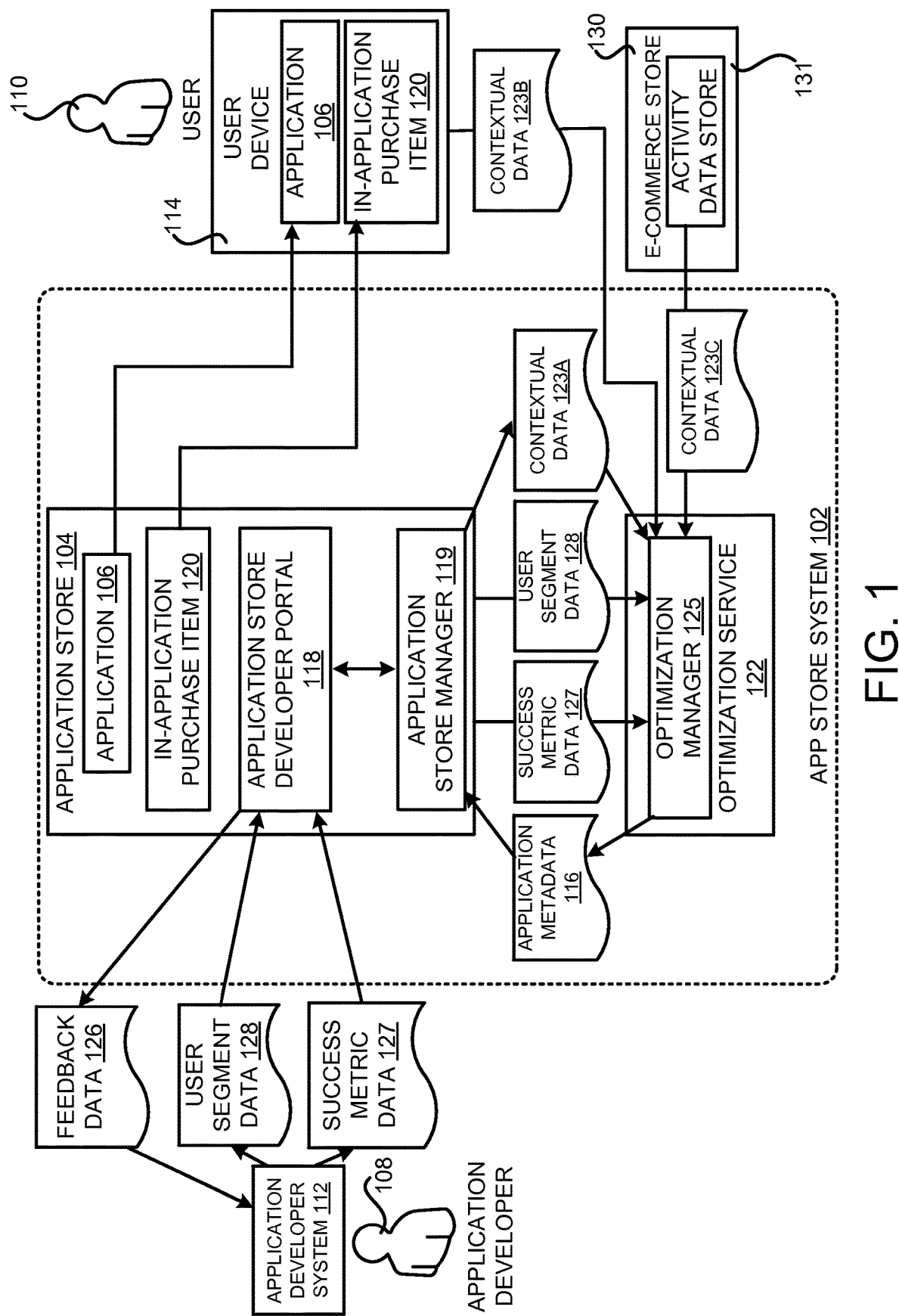
FIG. 1 is a system architecture diagram showing aspects of the configuration and operation of several components described herein for optimizing IAP items to achieve a developer-specified success metric.

The following detailed description is directed to technologies for optimizing in-application purchase (IAP) items, and potentially applications, to achieve a developer-specified metric. Utilizing an implementation of the technologies described herein, developers may tune applications and IAP items for specific customer segments based on success metrics that matter most to their business.

In some configurations, techniques disclosed herein allow developers or publishers of an application to provide data identifying a developer-specified success metric. A developer-specified success metric, for example, may define parameters or goals related to an area of focus, such as revenue, profit, customer engagement, application ratings and reviews, application referrals, etc. In addition, the developer or publisher might specify data defining a segment of users for which the IAP item or application is to be optimized for the specified success metric. For example, data defining a segment of users may include a number of parameters such as an age range, a geographic area, an experience level, or any other data that may characterize a user or a group of users. The techniques disclosed herein dynamically modify IAP items for each segment of users in an attempt to achieve the developer-specified success metric.

In some configurations, the techniques disclosed herein automatically determine the most optimal combination of IAP item attributes, such as price, behavior, timing, etc., having an impact on the developer-specified success metric. The IAP item attributes can be identified through various types of analysis, such as behavioral analysis, that continually determine which IAP items or IAP item attributes a particular customer segment is most interested in. As will be described below, techniques disclosed herein can also modify IAP item attributes based on continually updated contextual data to achieve one or more developer-specified success metrics for a user segment.

In some configurations, contextual data is received from a number of resources, such as an application store, an e-commerce system, and a user device. The contextual data may define user characteristics, user activity and/or other information such as user preference data. For instance, the contextual data may include information such as a user's purchase history, personal information and other data defining user activity, characteristics, and/or qualities. Such data may include a number of licenses associated with a particular user, transaction dates, price information, gender, age, achievements, and other information such as browsing history or a shopping wish list. The contextual data may also define user behavioral activity, such as application or IAP usage, achievements, patterns of movement, scores, habits, performance data, etc.

As will be described in more detail below, configurations disclosed herein utilize the contextual data to modify or generate attributes of an application or an IAP item to achieve one or more developer-specified success metrics. Utilization of contextual information from multiple resources allows the disclosed system to determine timely and focused solutions for optimizing an application or an IAP item. For example, user activity on one system, such as an e-commerce website, may be utilized to make modifications to aspects of an application or IAP item. One or more modifications, such as a price adjustment of an IAP item, may be based on an event or activity, such as usage data of an application that is monitored in real-time.

In order to enable the functionality disclosed briefly above, application developers may register their applications and IAP items for participation in an optimization service that operates in conjunction with an application store. Similarly, end users might also register for participation in a program in some configurations. In some configurations, user participation may also involve participation in other programs provided by an operator of the application store, such as participation in a program by which users interact with an e-commerce store and potentially other systems.

In some configurations, a user may download, install and utilize an application on one or more user devices to participate in the program and access applications and IAP items. For example, and without limitation, a user may be required to install and utilize an application that provides access to other applications and IAP items. The IAP items may provide a setting or a modification to at least one attribute of the application. In one illustrative example, an IAP item may provide the user of a new character in a game, code for providing notices and reminders, or code or data for any other feature. The IAP items may be free or based on a fee. In addition, the IAP item might also provide recommendations of e-commerce items of interest to the user, advertisements to the user, and/or other offers to make a purchase of items. The IAP items may include plug-in data, executable code, a document, audio or video media, or data defining settings or a modification for an application.

Application developers that participate in the program may also define one or more developer-specified success metrics. In some configurations, developer-specified success metrics may include one or more goals, tasks, and/or areas of focus. For instance, the developer-specified success metrics may define goals in one or more areas, such as revenue, profit, customer engagement, application ratings, reviews, application referrals, etc.

Techniques disclosed herein also provide mechanisms for developers to provide data defining a segment of users. In some configurations, the developer-specified success metric or other input data may include data defining a segment of users. For example, data can define a segment of users by the use of one or more parameters, such as, but not limited to 'first time users of an application,' 'active users of an application,' 'foreign (i.e. located in another country) customers,' 'advanced gamers' and others. As will be described in more detail below, the use of data defining a segment of users enables the service disclosed herein to determine targeted modifications to one or more IAP items or applications, thereby freeing the developer from having to perform the task manually.

In an example utilizing data defining a developer-specified success metric and a segment of users, a developer can specify 'revenue' as the success metric they want to optimize for 'paid users' and at the same time, the developer can specify 'engagement' as the success metric for 'non-paying customers.' In another example, a developer may want to offer a sales price for an IAP item to a group of new users within a specified age bracket and within a specified geographic location. At the same time, the developer may not want to offer the sales price to advanced users. A segment of users may be defined by any number of parameters such as, an age bracket, a geographic location, a number of licenses associated with a user, a level of experience in one or more applications, and/or other data such as a purchase history. As will be described below, the data defining the segment of users may be derived from contextual data or provided by another resource, such as an input by an application developer. Additional details regarding the various components and processes described briefly above for optimizing IAP items to a achieve a developer-supplied success metric will be presented below with regard to FIGS. 1-5.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of several components described herein. As shown in FIG. 1, various computing systems and software components (referred to herein as an application store system 102) may be configured and operated to provide an application store 104. An application store 104 is an electronic marketplace where customers can browse and purchase application programs, such as an application 106, for download and use on their own customer devices, such as the user device 114. An application store 104 might offer applications for use on user devices 114 such as smart phones, tablet computers, laptop or desktop computers, and/or other types of computing devices. As will be described in more detail below, to provide the functionality described herein, the application store 104 may interact with other systems or platforms including an application developer system 112, an optimization service 122, and an e-commerce store 130.

In order to provide the application store 104 and, potentially, the other functionality disclosed herein, the application store system 102 might include one or more application servers (not shown in FIG. 1). The application servers may execute a number of software components in order to provide the application store services described herein. The software components may execute on a single application server or in parallel across multiple application servers. In addition, each software component may consist of a number of subcomponents executing on different application servers or other virtual or physical computing resources. Various components may be implemented as software, hardware, or any combination of the two.

For illustrative purposes, the functionality disclosed herein may be implemented, at least in part, by the use of an application store manager 119. As will be described in more detail below, the application store manager 119 may manage the processing and communication of an application 106, an IAP item 120 and other data such as success metric data 127 and user segment data 128. The success metric data 127 and user segment data 128 may be received by one or more components, such as an application store developer portal 118. The application store developer portal 118 can also be configured to communicate with the application store manager 119. In some configurations the success metric data 127 and user segment data 128 may be communicated from the application developer system 112 to the application store manager 119 for processing as described below.

It should be appreciated that the application store computing system 102 shown in FIG. 1 has been simplified for discussion purposes and that many additional software and hardware components may be utilized. In particular, the application store system 102 might interoperate with many other computing systems in order to provide the application store 104. For example, the application store system 102 might interoperate with other systems and/or services not shown in FIG. 1, such as billing systems, reporting systems, customer relationship management systems, and others.

A user 110 of the application store 104 may interact with a user device 114 to access the application store 104 through a network (not shown in FIG. 1), such as the Internet. A user 110 may be an individual, customer, or entity that desires to browse, purchase, or has purchased, one or more applications from the application store 104. The user device 114 may be a smartphone, personal computer ("PC"), desktop workstation, laptop computer, tablet computer, notebook computer, personal digital assistant ("PDA"), electronic-book reader, game console, set-top box, consumer electronics device, server computer, or any other type of computing device capable of connecting to a data communications network and communicating with the application store 104.

In some configurations, software components executing on the application store system 102 provide functionality for permitting customers to browse and purchase applications 106 available from the application store 104. For instance, the application store 104 may receive a browse request from a user device 114 and, in response thereto, retrieve information regarding a particular application 106 offered for sale from the application store 104 referenced by the browse request, generate or retrieve information describing the application 106, and transmit the information over a network to a client application (not shown in FIG. 1) executing on the user device 114 for display to the user 110. The application information may include a name of the application 106, the name of an application developer 108 that developed the application 106, a text description of the application 106, one or more images of the application 106 during execution, a price for the application 106, and/or other information. Similar information regarding and IAP item 120 may be processed and communicated by the application store 104. The application information might be stored in a suitable database or other type of data store maintained by the application store system 102 for each application 106 offered for sale.

The network utilized to connect to the application store 104 might be a local-area network ("LAN"), a wide-area network ("WAN"), the Internet, or any other networking topology known in the art that connects a user device 114 to the application store 104. A user 110 may interface with a client application (not shown in FIG. 1) executing on the user device 114 to access and utilize the functionality provided by the application store 104. The client application might be a Web browser or a stand-alone client application configured for communicating with the application store 104. The client application might also utilize any number of communication methods known in the art to communicate with the application store 104 across a network, including remote procedure calls, network service calls, remote file access, proprietary client-server architectures, and the like.

The application store 104 might also provide functionality for allowing an application developer 110 to submit an application 106 for inclusion in the application store 104. For example, and without limitation, the application store 104 may be configured to provide an application store developer portal 118 in some configurations. The application store developer portal 118 provides a Web-based interface through which an application developer 108 can create a new developer account in the application store 104, submit an application 106 for inclusion in the application store 104, and define application metadata for the application 106, such as a description of the application 106, the price for the application, if any, and other information pertinent to the application 106. A developer 108 may work with an application developer system 112, which may configured to accommodate one or more software developer kits ("SDKs") and other tools for communicating, processing and modifying the application 106.

The application metadata can also include data defining IAP items 120. The application metadata may include information such as a list of available IAP items 120 for an application 106, purchase terms, price information, behavioral data for an IAP item, etc. As discussed briefly above, an IAP item 120 is an item that a user 110 can purchase from within an application 106. IAP items 120 can include, but are not limited to, subscriptions, consumables, and entitlements. A subscription may be any type of content that carries an entitlement or feature, can be bound by a period of time, and may auto-renew at the end of the period. A consumable in-application purchase is content that is used within an application, such as perishable items like extra lives in a game or in-application currency. An entitlement is content that requires access rights to access, such as a purchased copy of an electronic magazine issue or the unlocking of a level in a game. It should be appreciated that these examples are merely illustrative and that an application developer might define other types of IAP items 120 in other configurations.

As discussed briefly above, the application store 104 may be configured to obtain data defining one or more developer-specified success metrics. For illustrative purposes, the developer-specified success metric may also be referred to herein as "success metric data 127." Data defining one or more developer-specified success metrics may be obtained in a number of ways and the data may be in any format. For example, the application developer 108 may utilize the application store developer portal 118, or another mechanism such as an API, to provide parameters defining a goal, task, and/or an area of improvement. For instance, a developer-specified success metric may indicate a desire to optimize revenue, profit, and/or customer engagement. In other examples, a developer-specified success metric may indicate that an application developer 108 desires to receive a threshold level of application ratings, reviews, application referrals, etc. In addition, the developer-specified success metric can identify a number of items offered to a user or a segment of users. In yet another example, the developer-specified success metric may identify or describe a promotion model that may offer rewards to a user or a segment of users.

The application developer 108 may also utilize the application store developer portal 118 or another component to provide data defining a segment of users 110. For illustrative purposes, data indicating a segment of users is also referred to herein as "user segment data 128." As summarized above, data defining a segment of users may include one or more parameters, such as an age range, a geographic area, an experience level, or any other data that may characterize a user or a group of users 110. These examples are provided for illustrative purposes and are not to be construed as limiting.

As will be described in more detail below, in some configurations, the data defining a developer-specified success metric may be processed with the data defining a segment of users to allow developers to define different goals for different segments of users. In one illustrative example, an application developer 108 may have a goal of optimizing the number of reviews that are submitted by users 110 of a particular application 106. In another example, the application developer 108 may have a goal of optimizing user engagement of novice users of a game application. In yet another example, an application developer 108 may have a goal of optimizing the sale of one or more in-application purchase items 120 to users 110 located in a particular geographic area that are also above a predetermined age. As will be described in more detail, techniques herein may modify attributes of one or more IAP items 120 for a segment of users 110 in an attempt to achieve the developer-specified success metric.

As shown in FIG. 1, contextual data 123 can be obtained from various source and utilized to optimize an IAP item 120 to achieve a developer-specified success metric. The contextual data 123 may include data defining user characteristics, user activity and/or other information. The contextual data 123 may be obtained from any number of resources including, but not limited to, the e-commerce store 130 (i.e. contextual data 123C), the user device 114 (i.e. contextual data 123B), and the application store 104 (i.e. contextual data 123A).

An appropriate data store, such as the activity data store 131, may store and provide contextual data 123C that defines user characteristics. For instance, the contextual data 123C may include data such as a user's purchase history at an e-commerce store 130, personal information and other data defining user activity and/or qualities. Such data may include a number of licenses associated with a particular user, transaction dates, price information, and other information such as browsing history and wish list data. The contextual data 123C may also include other information related to a user such as a user's location, age, gender, address, and other personal information. The contextual data 123C may also include purchase records identifying items, categories of items, related products and other data used for suggesting related items.

In another example, the techniques disclosed herein may monitor user activity on a computer with appropriate user consent, such as the user device 114. Such data may include movement pattern data, game status data, and/or other data that describes the behavior of one or more users. As will be described below, contextual 123B data defining user activity can be obtained for processing by the techniques disclosed herein in real time. Thus, timely solutions for optimizing an application or an IAP item 120 may be provided to users 110 as they use an application 106 or an IAP item 120. These examples are provided for illustrative purposes and are not to be construed as limiting. It can be appreciated that contextual data 123 processed by the techniques disclosed herein may come from any resource or any system.

The techniques disclosed herein may be implemented on any system or device. For illustrative purposes, techniques disclosed herein are performed by the optimization service 122. As will be described in more detail below, an optimization manager 125 that operates in conjunction with the optimization service 122 can be configured to receive user segment data 128, success metric data 127, and/or contextual data 123 to determine various types of modifications for an IAP item 120 or, potentially, for an application 106. In some configurations, the optimization manager 125 may generate application metadata 116, which may be used to modify attributes of an IAP item 120.

Although FIG. 1 illustrates a configuration where the optimization service 122 is part of the application store system 102, and separate from the e-commerce store 130, it can be appreciated that the optimization service 122 may be implemented as part of any system or computer. It can also be appreciated that one or more aspects of the optimization service 122 may be implemented in any one of the systems depicted in FIG. 1 or any other system or computer.

In the illustrative example of FIG. 1, the optimization service 122 can be configured to receive contextual data 123 from one or more resources, such as the application store 104, the e-commerce store 130 and other devices such as the user device 114. The optimization service 122 can also obtain data defining a developer-specified success metric and/or data defining a segment of users. In addition, optimization service 122 can also obtain data identifying the application 106, which may include an application identifier, account information, and/or other data related to the application 106. The optimization service 122 can also obtain data identifying IAP items 120, which may include an IAP item identifier, account information, and/or other related data.

During operation, the optimization service 122 identifies a modification that may be applied to an IAP item 120, such as the modification of attributes of the IAP item 120, to achieve a developer-specified metric. In some configurations, a modification may be applied to an IAP item 120 if the contextual data 123 or other data includes a pattern of data that comports to one or more aspects of the data defining a developer-specified success metric and/or the data defining a segment of users. As will be described in more detail below, in some configurations, a modification may be identified when the optimization service 122 detects an event or a scenario, e.g., a user achievement or a game status, that may benefit from a modification of an IAP item 120 to achieve a developer-specified metric.

In some configurations, the optimization service 122 determines various combinations of IAP item 120 attributes, such as price, behavior, timing, and other factors having an impact on the developer-specified success metric. Individual datasets defining attribute combinations may be ranked based on an effectiveness value that is indicative of a level of impact an individual dataset of attributes has on the developer-specified success metric. One or more IAP items 120 may be selected based on the ranking. In some configurations, one or more IAP items 120 may be selected if a ranking or an effectiveness value exceeds a threshold. By the use of such techniques, the IAP item 120 attributes are identified through machine learning that continually determines which IAP items 120 or IAP item attributes a particular customer segment is most interested in.

Once the optimization service 122 identifies one or more modifications, application metadata 116 defining the attributes may be communicated to a resource, such as the application store 104, to generate, update, and distribute one or more IAP items 120 configured with the attributes. For example, the application metadata 116 might indicate that a price for an IAP item 120 is to be modified in an attempt to achieve the developer-specified success metric. In addition, the techniques disclosed herein may also communicate data identifying one or more IAP items 120 that may be modified using the attributes.

As summarized above, the application metadata 116 can include data defining IAP items 120. In some configurations, the application metadata 116 may include one or more attributes that control aspects of items such as, subscriptions, consumables, and entitlements. For example, one or more attributes may indicate a length of time for an in-application subscription. In another example, one or more attributes may control a frequency at which the one or more IAP items 120 are displayed to users 110 while using the application 106. In yet another example, one or more attributes may control aspects of an application, such as the number of lives in a game, a shirt color of a game avatar, or any other behavior of an application 106. It should be appreciated that these examples are merely illustrative and are not to be construed as limiting.

As summarized above, the techniques described herein can also modify attributes of an IAP item 120 for a segment of users to achieve a developer-specified success metric. For example, if a developer-specified success metric defines a goal related to optimizing advertisement notifications for a particular age group, the techniques disclosed herein can modify attributes that control a frequency at which one or more IAP items 120 are displayed to users in the age group when using the application 106. In another example, contextual data 123, such as a shopping history for a group of users 110, may indicate that the group of users 110 like the color red. If a developer-specified success metric indicates a desire to optimize a user experience, for example, techniques described herein can modify one or more attributes that may present the color red in a particular application 106.

In some configurations, the determined attributes may define a number of items offered to a user or a segment of users. In addition, the determined attributes can change the number of offered items to achieve a success metric. In such an example, an IAP item 120 may originally award ten free items in a game. Based on the techniques disclosed herein, the number of free items may change to another number to achieve one or more success metrics. In some configurations, the determined attributes can be configured to identify or describe a promotion model that may offer awards or rewards to a user or a segment of users. For example, an award or reward may be issued to a segment of users if the contextual data 123 indicates that an award, reward and/or bonus that may benefit a success metric.

In some configurations, the IAP items 120 and/or related attributes are modified and/or configured in such a manner that the IAP items 120 can be deployed and utilized by an application 106 without requiring the application 106 to be recompiled, re-published or re-released. By the use of such techniques, timely and rapid deployment of the modifications may be possible.

The configurations described herein may utilize any number of techniques for processing, generating and analyzing contextual data 123. Any known technology for analyzing contextual data 123 to identify a scenario or circumstance may be utilized. For example, contextual data 123, e.g., purchase history data and game play data, may be processed to determine that a large number of novice users that accomplish a first level of a particular game also have a pattern of purchasing a game tool for use in a second level of the game. The use of such contextual data 123 enables configurations to invoke one or more actions based on the presence of a scenario that may be influenced to further a developer-specified success metric. In the current example, if a developer-specified success metric indicates a desire to optimize the sale of tools in a game, configurations may modify attributes of an IAP item 120 to produce an advertisement for the game tool when a novice user accomplishes the first level of the game.

As summarized herein, machine learning techniques may be utilized to determine which IAP items 120 or IAP item attributes a particular customer segment is most interested in. The term "machine learning" may refer to one or more programs that learns from the data it receives. For example, a machine learning mechanism may build, modify or otherwise utilize a model that is created from example inputs and makes predictions or decisions using the model. In the current example, the machine learning mechanism may be used to improve the identification of attributes for an IAP item 120 or an application 106. The model may be trained using supervised and/or unsupervised learning. For instance, over time as the machine learning mechanism receives more data, the attributes or other content may change based on actual data that is received.

Different machine learning mechanisms may be utilized. For example, a linear regression mechanism may be to generate a score based on the contextual data 123. Linear regression may refer to a process for modeling the relationship between one variable, such as a purchase history data point, with one or more other variables, such as a game status data point. Different linear regression models might be used to calculate the score. For example, a least squares approach might be utilized, a maximum-likelihood estimation might be utilized, or another approach might be utilized.

For illustrative purposes, consider the following example: a game developer 108 has an existing game and the developer wishes to optimize IAP items 120 across three customer segments 1) new customers that are playing level one of the game for the first time, 2) customers located in Japan and 3) active customers who have passed a threshold level in the game. In this example, it is a given that the developer 108 wants to tune items at particular moments in the game, which may be defined by levels.

By the use of the techniques described herein, the developer 108 can configure a developer-specified success metric for each individual segment of users. Specifically, for new customers, the developer 108 can configure a developer-specified success metric to increase user engagement by tuning the behavior of characters in level one of the game. For customers located in Japan, the developer 108 can configure a developer-specified success metric to increase revenue by tuning in-game items just for that group of users. For active customers, the developer 108 can configure the developer-specified success metric to generate more revenue from these types of users by tuning items in levels of play above a threshold level.

In order to provide the functionality described above, the optimization service 122 may analyze contextual data 123 for each segment of users separately and tune the IAP items 120 for the given success criteria. For example, the optimization service 122 may be configured to obtain customer behavioral data to identify what motivates the customers and then link that motivation to the optimal in-game item. In another example, the optimization service 122 may be configured to determine that new customers joining a game like certain colors, such as red and green colors. In that case, the optimization service 122 may recommend an IAP item 120 to present green characters to the customers that like green, and at the same time, the IAP item 120 may present red characters to the customers that like red.

For users located in Japan, the optimization service 122 may be configured to analyze contextual data 123 associated with users located in Japan to identify the type of IAP items 120 that drive their spending. For example, the optimization service 122 may find that such users spend the most on IAP items 120 that give away virtual currency. In that case, the optimization service 122 may modify an IAP item 120 that shows more items that offer virtual currency. The modified IAP items 120 may then be sent to the appropriate devices 114 which, in turn, may provide results to achieve the respective developer-specified success metrics.

In some configurations, the optimization service 122 is configured to detect a changed circumstance and take action based on the changed circumstance. In one illustrative example, a developer-specified success metric may define a goal for a developer 108 to receive a number of reviews for a particular application 106. When the particular application 106 is first released, usage data may be collected by the optimization service 122. Based on the usage data, techniques described herein may generate application metadata 116 for an IAP item 120 instructing the application 106 to provide reminders to the user 110 to submit a review for the application 106. The techniques described herein may also modify the application metadata 116 based on a changed circumstance. In the present example, once the developer 108 has reached his or her goal, e.g., they have received a threshold amount of reviews, the techniques described herein may modify the IAP item 120 instructing the application 106 to stop providing the reminders.

The processing of the contextual data 123 and/or the developer-specified success metric may involve any algorithm for analyzing data to generate contextual data 123. For example, in some configurations, the optimization service 122 analyzes the obtained data 123 to determine a context and one or more recommendations may be determined based on the context. For example, the contextual data 123, e.g., purchase history, experience level and age, may be processed to determine a first context. Data defining the first context, for example, may indicate that novice users under the age of 21 that accomplish a first level of a particular game typically purchase a game tool for use in a second level of the game.

While monitoring usage data of a device, such as the user device 114, the optimization service 122 may determine a second context from the usage data and/or other data. In the current example, data defining the second context may indicate that a particular user just finished the first level of the game. The optimization service 122 may modify attributes of an IAP item 120 based on a relationship between the first context and the second context. The optimization service 122 may then configure or modify an IAP item 120 based on a relationship between the first context, the second context, and a developer-specified metric. In the present example, the optimization service 122 may configure an IAP item 120 that is configured to offer the game tool to users under the age of 21 that accomplish the first level of the game. This example is provided for illustrative purposes is not to be construed as limiting.

As summarized above, techniques described herein also store and process data for machine learning purposes. For example, in some configurations the optimization service 122 may collect and process updated contextual data 123, which may function as feedback on the effectiveness of the modifications to the IAP items 120. As a result, modifications to IAP items 120 generated by the techniques described herein may improve over time as additional contextual data 123 is processed. This mechanism allows the optimization service 122 to learn customer behavior, their motivations and the IAP items 120 that drive the customer actions and decisions. As the system learns, it can configure new modifications for applications 106 and IAP items 120 that help achieve one or more developer-specified metrics.

In one illustrative example, a developer 108 may provide data defining a segment of users, such as novice users. In addition, in this example, a developer-specified metric may indicate that the developer 108 would like to optimize user engagement of an application 106 for novice users. After the application 106 is released on the application store 104, by the use of the techniques disclosed herein, the optimization service 122 may determine that lowering the difficulty level of the application 106 may improve user engagement. The optimization service 122 may then cause the application store 104 to modify attributes of the application 106 to lower the difficulty level of the application 106.

After the modified IAP item 120 or application 106 has been provided to the segment of users 110, further contextual data 123, such as usage data and other behavioral information, may be analyzed to determine if the modification was effective achieving the developer-specified metric. Further modifications, such as lowering the difficulty level or even raising the difficulty level, may be applied to the IAP item 120 or the application 106. Dynamic modifications to such attributes allow the techniques disclosed herein to continually tune each IAP item 120 or application 106. This example is provided for illustrative purposes and is not to be construed as limiting. It can be appreciated that the modifications to the IAP item 120 or application 106 may include the modification of attributes that affect any behavior, appearance, character or any other function of a related application 106.

In some configurations, the optimization service 122 is configured to communicate feedback data 126 to one or more devices or computers. The feedback data 126 can include performance results, recommendations, and/or other data. For example, the feedback data 126 may include data describing updated revenue or profit information for an IAP item 120 or a modified IAP item 120, or other data such as data indicating a number of references or reviews, etc. In other examples, the feedback data 126 may include recommendations for the application developer 108. In one illustrative example, feedback data 126 may include a recommendation for the developer to change any attribute of an application 106 or an IAP item 120.

In some configurations, the feedback data 126 may include the contextual data 123 and/or the application metadata 116. For example, the feedback data 126 may include aspects of application metadata 116 or other data describing a recommendation for modifying aspects of the application 106 or the IAP item 120. For instance, if the contextual data 123 indicates that a segment of users or an individual user has a preference or exhibits certain behavioral patterns, the feedback data 126 may communicate such information to the application developer 108. Select information about a user or a segment of users, such as an achievement, preferred color, recent purchase, playing style, etc., can be automatically communicated to the application developer 106 or any other user or system. Thus, in addition to automatically modifying or customizing an IAP item 120, the techniques disclosed herein can communicate other data, such as data describing suggested modifications, user activity and/or behavior, enabling the application developer 106 or another user to modify an IAP item 120 or an application 106 in accordance with one or more success metrics.

Figure 2A:
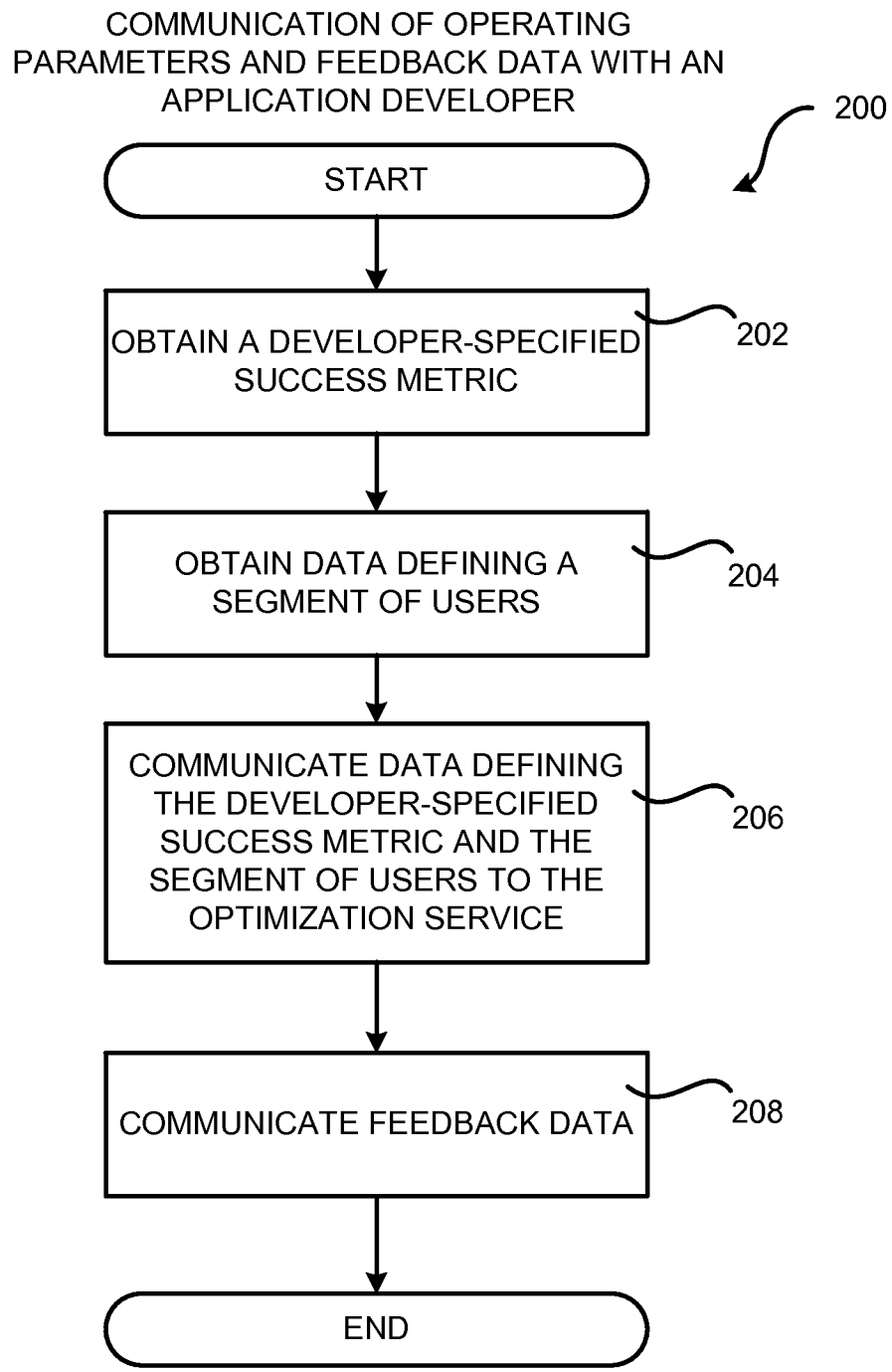
FIG. 2A is a flow diagram illustrating aspects of a routine disclosed herein for communicating data between an application developer and several components described herein for optimizing IAP items.
Figure 2B:
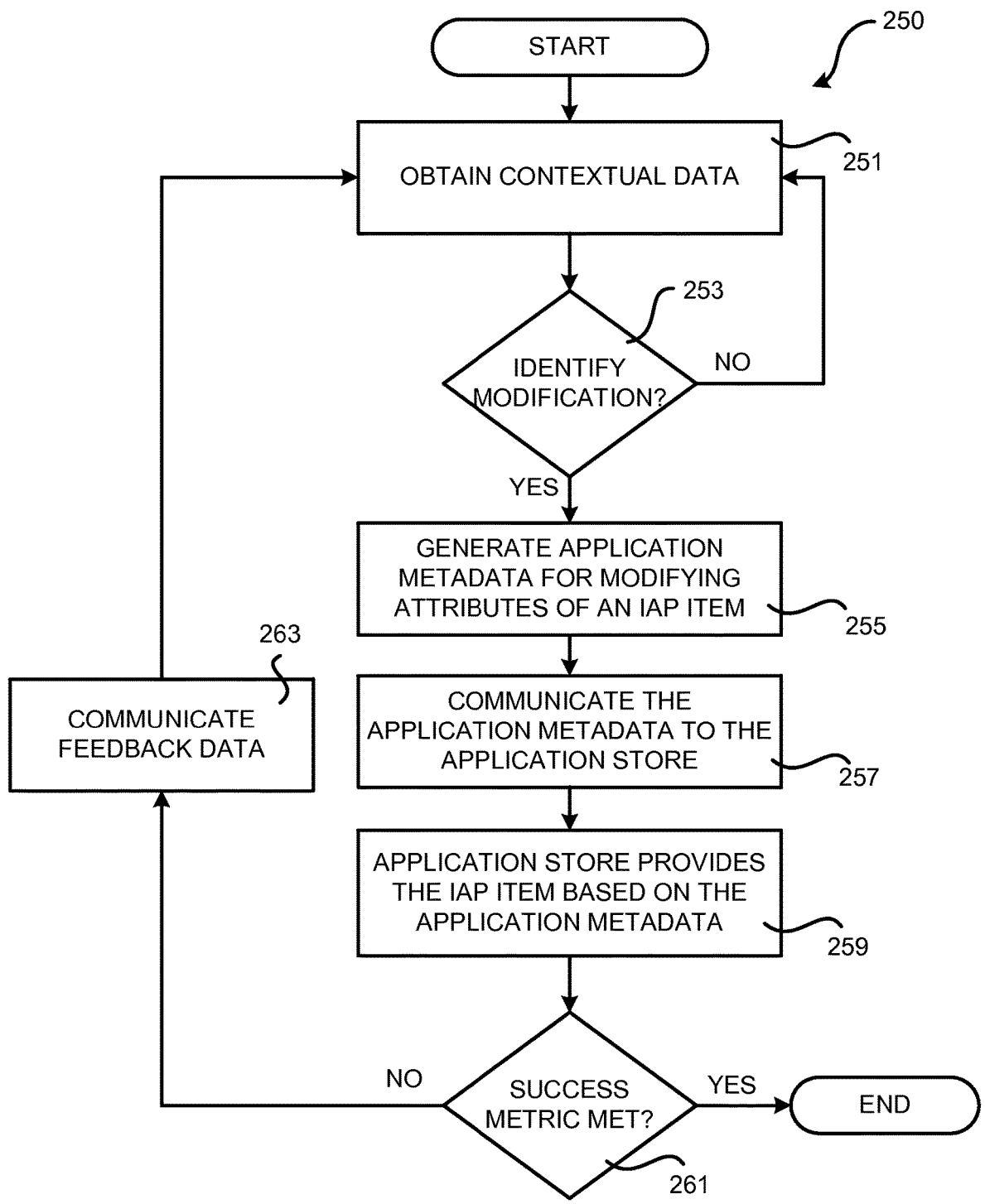
FIG. 2B is a flow diagram illustrating aspects of a routine disclosed herein for optimizing IAP items to achieve a developer-specified metric.

FIG. 2A is a flow diagram illustrating aspects of a routine 200 disclosed herein for communicating input data, such as success metric data 127, user segment data 128, and feedback data 126, with an application developer 108. FIG. 2B is a flow diagram illustrating aspects of a routine 250 for optimizing IAP items 120 to achieve a developer-specified success metric. It should be appreciated that the logical operations described herein with respect to FIG. 2A, FIG. 2B, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

As shown in FIG. 2A, the routine 200 begins at operation 202, where the optimization service 122 obtains data defining a developer-specified success metric. As summarized above, a developer-specified success metric, for example, may define parameters or goals related to revenue, profit, customer engagement, application ratings and reviews, application referrals, etc. The developer-specified success metric may also include data identifying a related application 106, which may include an application identifier, account information, and/or other data.

Data defining the developer-specified success metric, e.g., the success metric data 127, may be obtained from any resource. For example, and without limitation, the application store developer portal 118 may be configured to receive data defining a developer-specified success metric from a user or another computer. Although the present disclosure refers to a developer-specified metric, it can be appreciated that operation 202 may involve the receipt of any data defining any type of metric for which IAP items 120 and/or an application 106 is to be optimized.

In operation 202, or as part of another operation, the optimization service 122 can also obtain data identifying an application 106 related to the developer-specified success metric. In some configurations, the data identifying the application 106 may include an application identifier, account information, and/or other related data. In addition, the optimization service 122 can also obtain data identifying one or more IAP items 120. In some configurations, operation 202 may involve receiving data identifying the one or more IAP items 120, which may include identifiers for individual IAP items 120, account information, and/or other related data.

Next, at operation 204, the optimization service 122 obtains data defining a segment of users, e.g., user segment data 128. As summarized above, data defining a segment of users may include one or more parameters, such as an age range, a geographic area, an experience level, or any other data that may characterize a user or a group of users. The data defining a segment of users may be obtained from any resource. For example, and without limitation, the application store developer portal 118 may be configured to receive data defining a segment of users.

Next, at operation 206, the success metric data 127 and/or the user segment data 127 can be communicated to a service or platform for processing. For example, the success metric data 127 and/or the user segment data 127 may be communicated from the application store 104 to the optimization service 122 for optimizing IAP items 120 to achieve a developer-specified metric. In one illustrative example, the success metric data 127 can also be communicated to the optimization service 122 from the application store developer portal 118 via the optimization manager 119.

At operation 208, the optimization service 122 may communicate feedback data 126 to one or more resources, such as the application developer system 112. Generally described, the feedback data 126 can include performance results, recommendations, and/or other data. The feedback data 126 may be configured and communicated in a manner as described above.

FIG. 2B illustrates one example routine 250 for optimizing IAP items 120 to achieve a developer-specified metric. The routine 250 begins at operation 251, where the optimization service 122 obtains contextual data 123. As summarized above, the contextual data 123 may be in any format and may be received from one or more resources such as the application store 104, e-commerce store 130 and/or one or more devices, such as the user device 114.

From operation 251, the routine 250 proceeds to operation 253, where the optimization service 122 identifies a modification to an IAP item 120 to achieve a developer-specified metric. As summarized above, a modification may be identified if the contextual data 123 or other data includes a pattern of data that comports to one or more aspects of the data defining a developer-specified success metric and/or the data defining a segment of users. For example, the optimization service 122 may identify a modification that can be applied to an IAP item 120 when the optimization service 122 detects an event or a scenario, e.g., a user achievement or a game status, that may benefit from a modification of an IAP item 120 to achieve the developer-specified metric. As described above, operation 253 may also involve other techniques for identifying modifications to one or more IAP items 120.

At operation 253, if the optimization service 122 does not identify a modification, the routine 250 returns to operation 251 where the optimization service 122 obtains updated contextual data 123. However, at operation 253, if the optimization service 122 identifies a modification, the routine 250 proceeds to operation 255.

At operation 255, the optimization service 122 generates application metadata 116 based on the contextual data 123, the success metric data 127 and/or the user segment data 127. As summarized above, configurations herein may generate application metadata 116 that define attributes of an IAP item 120. For instance, if the contextual data 123 indicates a need to change the difficulty level of a game, configurations disclosed herein may generate application metadata 116 to change the difficulty level of the game. As summarized above, the application metadata 116 may be configured to change one or more attributes of an application 106 or an IAP item 120 to achieve one or more developer-specified metrics.

Next, at operation 257, the application metadata 116 is communicated to the application store 104 for processing. As summarized above, the application metadata 116 is used to configure an IAP item 120 or an application 106. Although this example illustrates the communication of metadata to an application store 104, techniques disclosed herein may utilize a number of different platforms or services to process the application metadata 116 to configure or modify an IAP item 120. For instance, the application metadata 116 may be communicated to a device, such as the user device 114 for modification of an IAP item 120 or a modification of an application 106. In operation 257, the techniques disclosed herein may also communicate data identifying one or more related IAP items 120 with the application metadata 116.

Next, at operation 259, an IAP item 120 based on the application metadata 116 is provided. As summarized above, the application store 104 may modify an IAP item 120 based on the application metadata 116. The application store 104 may also deliver the modified IAP item 120 to one or more devices, such as the user device 114. In some configurations, the modified IAP item 120 is delivered to users in the segment of users defined by the application developer 108.

It can also be appreciated that the application metadata 116 may invoke one or more actions on the application store 104 or another platform. For instance, the application metadata 116 may change the price of an IAP item 120 or application 106, modify advertising models of the application store 104, or cause the application store 104 to interact with other platforms to influence modifications to other services. Thus, different actions related to an IAP item 120 may be modified and deployed using various forms of delivery methods.

After operation 259, the routine 250 continues at operation 261 where the optimization service 122 determines if the developer-specified success metric is achieved. As summarized above, the optimization service 122 can determine that the developer-specified success metric has been achieved based on one or more events or scenarios presented in the contextual data 123. For example, a developer-specified success metric can indicate a goal for a predetermined number of reviews. In such an example, the optimization service 122 may determine that the developer-specified success metric is achieved when the contextual data 123 indicates that a number of received reviews exceeds the predetermined number.

At operation 261, if the optimization service 122 determines that the developer-specified success metric is achieved, the routine 250 terminates. However, at operation 261, if the optimization service 122 determines that the developer-specified success metric is not achieved, the routine 250 continues to operation 263 where the optimization service 122 communicates feedback data to the application developer system 112. As summarized above, the feedback data 126 can include performance results, recommendations, and/or other data. For example, the feedback data 126 may include data describing updated revenue or profit information for an IAP item 120 or a modified IAP item 120, or other data such as data indicating a number of references or reviews, etc. In other examples, the feedback data 126 may include recommendations for the application developer 108. In one illustrative example, feedback data 126 may include a recommendation for the developer to change any attribute of an application 106 or an IAP item 120.

In some configurations, the feedback data 126 may include aspects of the contextual data 123 and/or the application metadata 116. For example, the feedback data 126 may include aspects of application metadata 116 or other data describing a recommendation for modifying aspects of the application 106 or the IAP item 120. For instance, if the contextual data 123 indicates that a segment of users or an individual user has a preference or exhibits certain behavioral patterns, the feedback data 126 may communicate such information to the application developer 108. Select information about a user or a segment of users, such as an achievement, preferred color, recent purchase, playing style, etc., can be automatically communicated to the application developer 106 or any other user or system. Thus, in addition to automatically modifying or customizing an IAP item 120, the techniques disclosed herein can communicate other data, such as data describing suggested modifications, user activity and/or behavior, enabling the application developer 106 or another user to modify an IAP item 120 or an application 106 in accordance with one or more success metrics. Next, after operation 263, the routine 250 may return to operation 251 where the optimization service 122 obtains additional contextual data 123 for further processing. In configurations where the developer-specified success metric defines an optimization without a pre-determined threshold, e.g., a goal of maximizing profit or revenue, the routine 250 may terminate in response to another event, such as a user input instructing the routine 250 to terminate for a particular developer-specified success metric. Feedback data 126 can be communicated at any stage of routine 250, even when the routine 250 is terminated by a user input or any other event.

In some configurations, iterations of the routine 250 may generate additional contextual data 123, such as updated usage data and updated purchase data, and based on the updated data, the accuracy of the modifications may be improved. In some configurations, the optimization service 122 may also receive feedback on the effectiveness of the modifications to the IAP items 120. Thus, once a modified IAP item 120 is delivered and used over time, updated contextual data 123, including sales data and/or other forms of performance data, may be used in the manner described herein to provide further improvements to the modifications of the IAP items 120.

Figure 3:
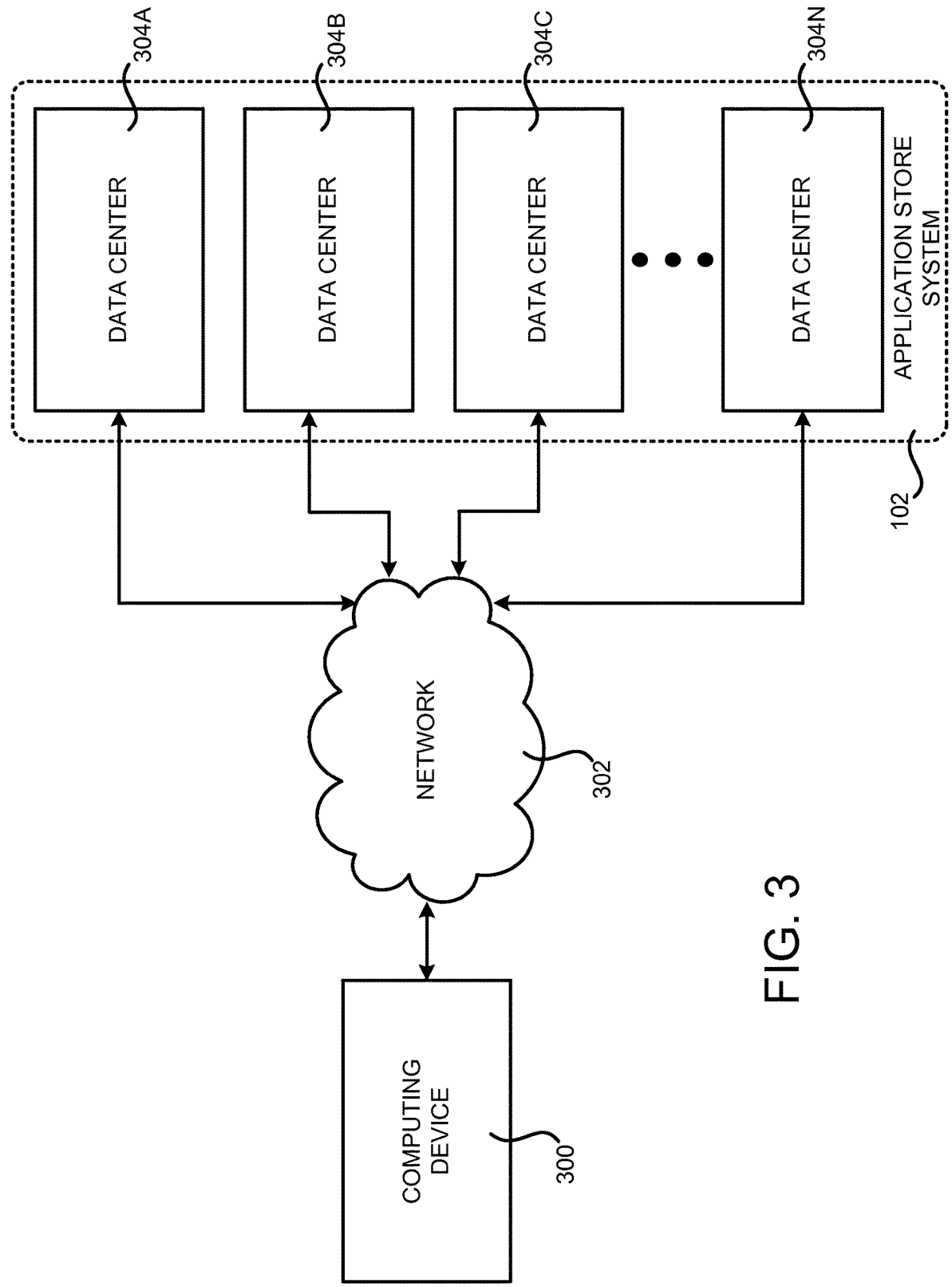
FIG. 3 is a system and network diagram that shows an illustrative operating environment that includes an application store system that may be configured to implement aspects of the functionality described herein.

FIG. 3 is a system and network diagram that shows one illustrative operating environment for the configurations disclosed herein that includes an application store system 102 that may be configured in the manner described above, according to one configuration disclosed herein. As discussed above, the application store system 102 can provide computing resources for implementing an application store 104. The computing resources provided by the application store system 102 may include various types of computing resources, such as data processing resources, data storage resources, networking resources, data communication resources, network services, and the like.

Each type of computing resource provided by the application store system 102 may be general-purpose or may be available in a number of specific configurations. For example, data processing resources may be available as physical computers or virtual machine instances in a number of different configurations. The virtual machine instances may be configured to execute applications, including Web servers, application servers, media servers, database servers, some or all of the services described above, and/or other types of programs. Data storage resources may include file storage devices, block storage devices, and the like. The application store system 102 might also be configured to provide other types of resources and network services.

The computing resources provided by the application store system 102 are enabled in one implementation by one or more data centers 304A-304N (which may be referred herein singularly as "a data center 304" or in the plural as "the data centers 304"). The data centers 304 are facilities utilized to house and operate computer systems and associated components. The data centers 304 typically include redundant and backup power, communications, cooling, and security systems. The data centers 304 might also be located in geographically disparate locations. One illustrative configuration for a data center 304 that implements some of the technologies disclosed herein will be described below with regard to FIG. 4.

The customers and other users of the application store system 102 may access the application store 104 provided by the application store system 102 over a network 302, which may be a wide area communication network ("WAN"), such as the Internet, an intranet or an Internet service provider ("ISP") network or a combination of such networks. For example, and without limitation, a computing device 300 operated by a customer or other user of the application store system 102 might be utilized to access the application store system 102 by way of the network 302. It should be appreciated that a local-area network ("LAN"), the Internet, or any other networking topology known in the art that connects the data centers 304 to remote customers and other users may be utilized. It should also be appreciated that combinations of such networks might also be utilized.

Figure 4:
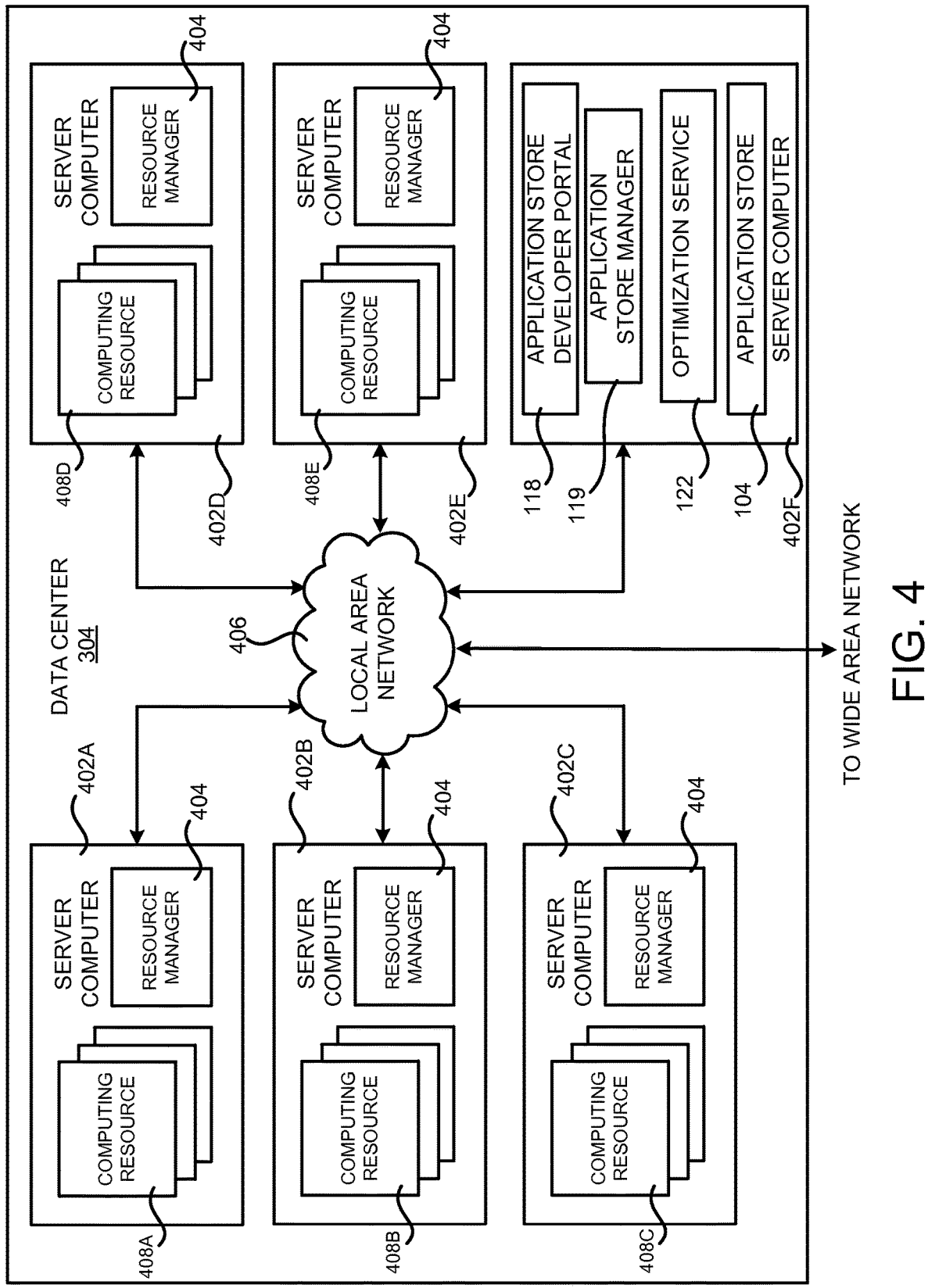
FIG. 4 is a computing system diagram that illustrates a configuration for a data center that may be utilized to implement aspects of the technologies disclosed herein.

FIG. 4 is a computing system diagram that illustrates one configuration for a data center 304 that implements aspects of the technologies disclosed herein. The example data center 304 shown in FIG. 4 includes several server computers 402A-402F (which may be referred to herein singularly as "a server computer 402" or in the plural as "the server computers 402") for providing computing resources 408A-408E.

The server computers 402 may be standard tower, rackmount, or blade server computers configured appropriately for providing the computing resources described herein. As mentioned above, the computing resources might be data processing resources such as virtual machine instances or hardware computing systems, data storage resources, database resources, networking resources, and others. Some of the servers 402 might also be configured to execute a resource manager 404 capable of instantiating and/or managing the computing resources. In the case of virtual machine instances, for example, the resource manager 404 might be a hypervisor or another type of program configured to enable the execution of multiple virtual machine instances on a single server 402. Server computers 402 in the data center 304 might also be configured to provide network services and other types of services for supporting the provision of an application store 104.

The data center 304 shown in FIG. 4 also includes a server computer 402F that may execute some or all of the software components described above. For example, and without limitation, the server computer 402F might be configured to execute software components for providing an application store, including the specific functionality disclosed herein. The server computer 402F might also be configured to execute other components and/or to store data for providing some or all of the functionality described herein. For example, the server computer 402F may include an application store developer portal 118, application store manager 119, optimization service 122, and the application store 104. In this regard, it should be appreciated that the software components illustrated in FIG. 4 as executing on the server computer 402F might execute on many other physical or virtual servers in the data centers 304 in various configurations.

In the example data center 304 shown in FIG. 4, an appropriate LAN 406 is also utilized to interconnect the server computers 402A-402F. The LAN 406 is also connected to the network 302 illustrated in FIG. 3. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 304A-304N, between each of the server computers 402A-402F in each data center 304, and, potentially, between computing resources in each of the data centers 304. It should be appreciated that the configuration of the data center 304 described with reference to FIG. 4 is merely illustrative and that other implementations might be utilized.

Figure 5:
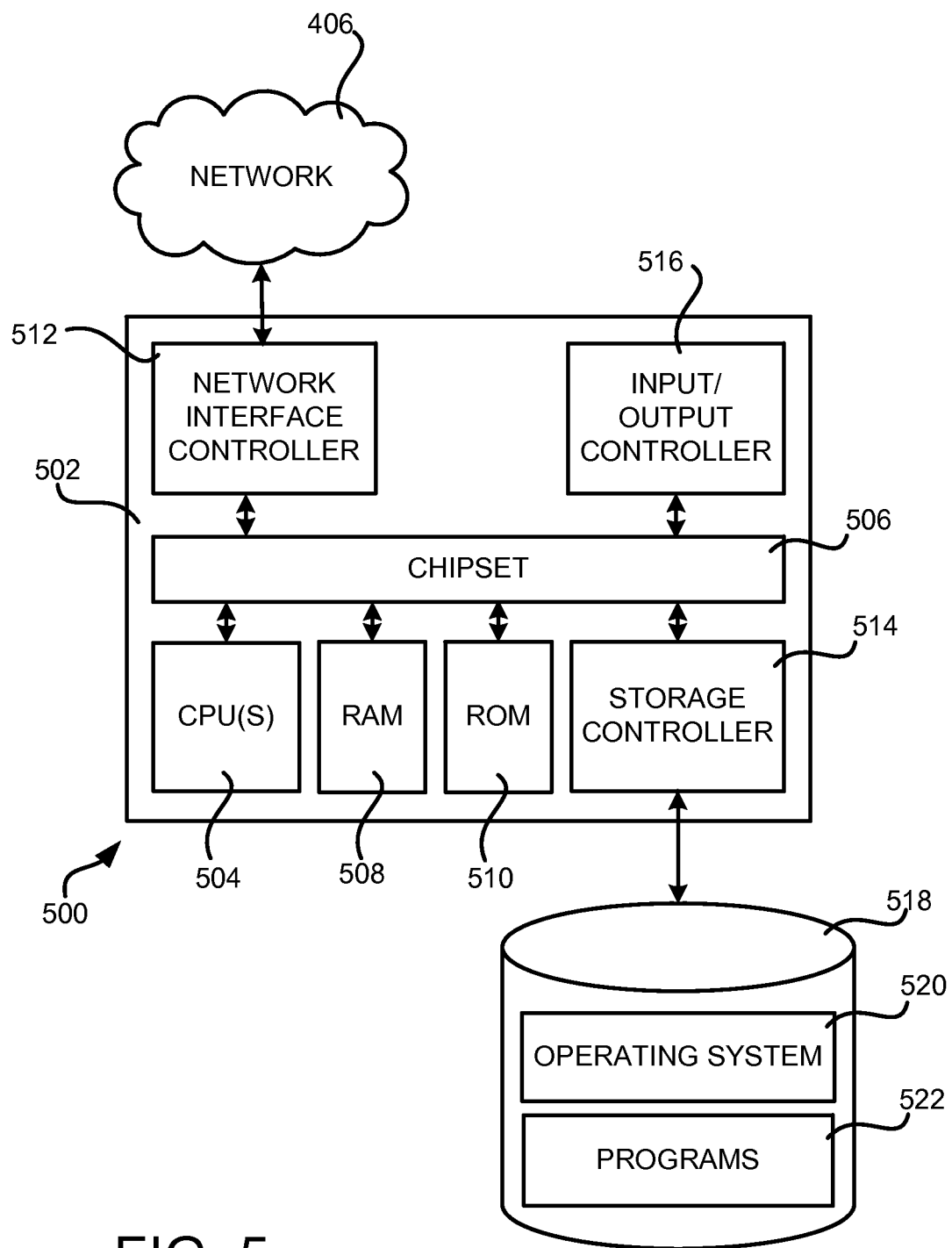
FIG. 5 is a computer architecture diagram showing an illustrative computer hardware architecture for implementing a computing device that might be utilized to implement aspects of the various technologies presented herein.

FIG. 5 shows an example computer architecture for a computer 500 capable of executing program components for implementing various aspects of the functionality described herein. The computer architecture shown in FIG. 5 illustrates a conventional server computer, workstation, desktop computer, laptop, tablet, network appliance, e-reader, smartphone, or other computing device, and may be utilized to execute any of the software components presented herein. For example, the computer architecture shown in FIG. 5 may be utilized to execute software components for providing an application store and the related functionality disclosed herein.

The computer 500 includes a baseboard 502, or "motherboard," which is a printed circuit board to which a multitude of components or devices may be connected by way of a system bus or other electrical communication paths. In one illustrative configuration, one or more central processing units ("CPUs") 504 operate in conjunction with a chipset 506. The CPUs 504 may be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 may provide an interface to a RAM 508, used as the main memory in the computer 500. The chipset 506 may further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM may also store other software components necessary for the operation of the computer 500 in accordance with the configurations described herein.

The computer 500 may operate in a networked environment using logical connections to remote computing devices and computer systems through a network, such as the network 606. The chipset 506 may include functionality for providing network connectivity through a NIC 512, such as a gigabit Ethernet adapter. The NIC 512 is capable of connecting the computer 500 to other computing devices over the network 606. It should be appreciated that multiple NICs 512 may be present in the computer 500, connecting the computer to other types of networks and remote computer systems.

The computer 500 may be connected to a mass storage device 518 that provides non-volatile storage for the computer. The mass storage device 518 may store an operating system 520, programs 522, and data, which have been described in greater detail herein. The mass storage device 518 may be connected to the computer 500 through a storage controller 514 connected to the chipset 506. The mass storage device 518 may consist of one or more physical storage units. The storage controller 514 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 may store data on the mass storage device 518 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 518 is characterized as primary or secondary storage, and the like.

For example, the computer 500 may store information to the mass storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 may further read information from the mass storage device 518 by detecting the physical states or characteristics of one or more particular locations within the physical storage units.

In addition to the mass storage device 518 described above, the computer 500 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 500.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 518 may store an operating system 520 utilized to control the operation of the computer 500. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 518 may store other system or application programs and data utilized by the computer 500.

In one configuration, the mass storage device 518 or other computer-readable storage media is encoded with computer-executable instructions which, when loaded into the computer 500, transform the computer from a general-purpose computing system into a special-purpose computer capable of implementing the configurations described herein. These computer-executable instructions transform the computer 500 by specifying how the CPUs 504 transition between states, as described above. According to one configuration, the computer 500 has access to computer-readable storage media storing computer-executable instructions which, when executed by the computer 500, perform the various processes described herein. The computer 500 might also include computer-readable storage media for performing any of the other computer-implemented operations described herein.

The computer 500 may also include one or more input/output controllers 516 for receiving and processing input from a number of input devices, such as a keyboard, a mouse, a touchpad, a touch screen, an electronic stylus, or other type of input device. Similarly, an input/output controller 516 may provide output to a display, such as a computer monitor, a flat-panel display, a digital projector, a printer, a plotter, or other type of output device. It will be appreciated that the computer 500 may not include all of the components shown in FIG. 5, may include other components that are not explicitly shown in FIG. 5, or may utilize an architecture completely different than that shown in FIG. 5.

It should be appreciated that although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims. It should also be appreciated that although the disclosure presented herein refers to "in-application items" and "in-application purchase items," it is to be understood that, in some configurations, these terms are synonymous. Further, both "in-application items" and "in-application purchase items" may refer to transactions which involve a fee or do not involve a fee.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computer-implemented method for optimizing one or more in-application purchase items associated with an application to achieve a developer-specified success metric, the method comprising:
   presenting a developer portal to access an application management system;
   receiving, at the application management system and from a developer system accessing the developer portal, first data identifying a plurality of success metrics, the plurality of success metrics comprising:
      a first success metric representing a first threshold number of reviews submitted by first users associated with the application;
      a second success metric representing a second threshold number of second users that are associated with the application and that are associated with a skill level that is less than or equal to a predetermined skill level; and
      a third success metric representing a third threshold number of in-application purchase item sales to third users that have an age equal to or above a pre-determined age;
   receiving, at the application management system and from the developer system accessing the developer portal, second data identifying a segment of users of the application, the segment comprising the first users, the second users, and the third users;
   receiving, at the application management system from the developer system, third data identifying the one or more in-application purchase items associated with the application;
   obtaining, at the application management system, contextual data describing user activity for the users in the segment of users, wherein the contextual data is obtained from an e-commerce system or a user device;
   determining that a modification of one or more attributes of the one or more in-application purchase items corresponds to achieving the plurality of success metrics; and
   modifying, at the application management system and based, at least in part, on the contextual data and the plurality of success metrics, the one or more attributes of the one or more in-application purchase items associated with the application for the users in the segment of users of the application.

2. The computer-implemented method of claim 1, wherein modifying the one or more attributes of the one or more in-application purchase items comprises modifying a price of the one or more in-application purchase items.

3. The computer-implemented method of claim 1, wherein modifying the one or more attributes of the one or more in-application purchase items comprises modifying a frequency at which the one or more in-application purchase items are displayed.

4. The computer-implemented method of claim 1, wherein modifying the one or more attributes of the one or more in-application purchase items comprises modifying a behavior of the one or more in-application purchase items.

5. The computer-implemented method of claim 1, wherein the plurality of success metrics are achieved by the modification of the one or more attributes to increase revenue.

6. The computer-implemented method of claim 1, wherein the one or more attributes comprise a length of time for an in-application subscription, further comprising:
   utilizing first contextual data to modify the length of time for the in-application subscription for the first users based, at least in part, on the first contextual data being determined to be associated with the first users;
   utilizing second contextual data to modify the length of time for the in-application subscription for the second users based, at least in part, on the second contextual data being determined to be associated with the second users; and
   utilizing third contextual data to modify the length of time for the in-application subscription for the third users based, at least in part, on the third contextual data being determined to be associated with the third users,
   wherein the first contextual data, the second contextual data, and the third contextual data are each received from a different resource, the different resources comprising an application store, the e-commerce system, and the user device.

7. The computer-implemented method of claim 1, further comprising:
   receiving, at the application management system from the developer system, behavioral information associated with the users in the segment of users; and
   modifying, to achieve any of the plurality of success metrics, a difficulty level of each of the application and an in-application purchase item of the one or more in-application purchase items, based, at least in part, on the behavioral information.

8. An apparatus for providing a service that optimizes one or more in-application purchase items associated with an application to achieve a success metric, the apparatus comprising:
   a processor; and
   a non-transitory computer-readable storage medium having instructions stored thereupon which are executable by the processor and which, when executed, cause the apparatus to:
      receive, based, at least in part, on an input provided by a developer system via a developer portal, data identifying at least one success metric of:
         a first success metric representing a number of reviews submitted by first users associated with the application,
         a second success metric representing a number of second users that are associated with the application and that are associated with a skill level that is less than or equal to a predetermined skill level, or
         a third success metric representing a number of in-application purchase item sales to third users that have an age equal to or above a pre-determined age;
      receive, based, at least in part, on the input provided by the developer system via the developer portal, first data identifying a segment of users of the application, the segment comprising the first users, the second users, and the third users;
      receive, at the apparatus, second data identifying the one or more in-application purchase items associated with the application;
      determine that a modification of one or more attributes of the one or more in-application purchase items corresponds to achieving the at least one success metric; and
      modify the one or more attributes of the one or more in-application purchase items associated with the application for the users in the segment of users of the application based, at least in part.

9. The apparatus of claim 8, wherein modifying the one or more attributes of the one or more in-application purchase items comprises modifying a price of the one or more in-application purchase items.

10. The apparatus of claim 8, wherein modifying the one or more attributes of the one or more in-application purchase items comprises modifying a frequency at which the one or more in-application purchase items are displayed.

11. The apparatus of claim 8, wherein modifying the one or more attributes of the one or more in-application purchase items comprises modifying a behavior of the one or more in-application purchase items.

12. The apparatus of claim 8, wherein the one or more attributes of the one or more in-application purchase items are determined based, at least in part, on third data defining user activity received via the developer portal and from the developer system.

13. The apparatus of claim 8, wherein the at least one success metric comprises, as a developer-specified success metric, the second success metric or the third success metric, and the modification of one or more attributes of the one or more in-application purchase items is determined to correspond to achieving the developer-specified success metric.

14. The apparatus of claim 8, wherein the modification of one or more attributes of the one or more in-application purchase items is determined to correspond to achieving more than one success metric of the at least one success metric.

15. A non-transitory computer-readable storage medium having computer-executable instructions stored thereupon which, when executed by a computer, cause the computer to:
receive, at a management application system and via an input provided via a developer portal, first data identifying at least one success metric of:
a first success metric representing a number of reviews submitted by first users associated with an application,
a second success metric representing a number of second users that are associated with the application and that are associated with a skill level that is less than or equal to a predetermined skill level, or
a third success metric representing a number of in-application purchase item sales to third users that have an age equal to or above a pre-determined age;
receive, at the management application system and via the input provided via the developer portal, second data identifying a segment of users of the application, the segment comprising the first users, the second users, and the third users; and
configure, at the management application system, at least one attribute for an in-application purchase item associated with the application for users of the application to achieve the at least one success metric.

16. The non-transitory computer-readable storage medium of claim 15, having further computer-executable instructions stored thereon that cause the computer to:
obtain contextual data related to the users in the segment of users; and
configure the at least one attribute for the in-application purchase item based, at least in part, on the contextual data.

17. The non-transitory computer-readable storage medium of claim 15, wherein configuring the at least one attribute for the in-application purchase item comprises configuring an award.

18. The non-transitory computer-readable storage medium of claim 15, wherein the at least one attribute for the in-application purchase item is configured based, at least in part, on third data defining user activity.

19. The non-transitory computer-readable storage medium of claim 15, having further computer-executable instructions stored thereon that cause the computer to communicate feedback data describing user activity or a recommendation based, at least in part, on the at least one attribute.

20. The non-transitory computer-readable storage medium of claim 15, wherein:
the at least one attribute comprises a color of the in-application purchase item associated with an in-game avatar;
the at least one success metric comprises, as a developer-specified success metric, the first success metric or the third success metric; and
the color of the in-application purchase item associated with the in-game avatar is configured to achieve the developer-specified success metric.

* * * * *